(12) United States Patent
Lin et al.

(10) Patent No.: US 9,879,996 B2
(45) Date of Patent: Jan. 30, 2018

(54) SYSTEM AND METHOD OF ELECTROSTATIC CAROUSELING FOR GYROCOMPASSING

(71) Applicant: General Electric Company, Schenectady, NY (US)

(72) Inventors: Yizhen Lin, Cohoes, NY (US); Todd Frederick Miller, Mechanicville, NY (US); Sergey Alexandrovich Zotov, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 254 days.

(21) Appl. No.: 14/954,108

(22) Filed: Nov. 30, 2015

(65) Prior Publication Data
US 2017/0153109 A1    Jun. 1, 2017

(51) Int. Cl.
*G01C 19/56* (2012.01)

(52) U.S. Cl.
CPC .................... *G01C 19/56* (2013.01)

(58) Field of Classification Search
CPC ........................................ G01C 19/56
See application file for complete search history.

(56) References Cited

U.S. PATENT DOCUMENTS 8,794,068 B2 *  8/2014  Judy ................. G01C 19/5698
                                                          73/504.12
2005/0022404 A1  2/2005  Ash et al.
(Continued)

FOREIGN PATENT DOCUMENTS

CN    103344227 A    10/2013
CN    103344230 A    10/2013
(Continued)

OTHER PUBLICATIONS

Trusov et al., "Force Rebalance, Whole Angle, and Self-Calibration Mechanization of Silicon MEMS Quad Mass Gyro," 1st IEEE International Symposium on Inertial Sensors and Systems—Proceedings, Laguna Beach, CA, United States, Feb. 25-26, 2014, Article No. 6782537, pp. 1-2.
(Continued)

*Primary Examiner* — Clayton E Laballe
*Assistant Examiner* — Dennis Hancock
(74) *Attorney, Agent, or Firm* — Ziolkowski Patent Solutions Group, SC; Jean K. Testa (57) ABSTRACT

A system and method for electrostatic carouseling for inertial sensor gyrocompassing is disclosed. For performing such electrostatic carouseling for inertial sensor gyrocompassing, a three-rotational degree of freedom spring-mass system is provided that includes a proof mass suspended by a plurality of support springs and having three rotational degrees of freedom, a plurality of driving electrodes, and a controller operably connected to the plurality of driving electrodes. The control applies an excitation voltage to the driving electrodes to generate an electrostatic force, with the controller selectively applying the excitation voltage to the plurality of driving electrodes to generate an electrostatic force that varies an orientation of a gyroscope sensitivity axis for carouseling of the three-rotational degree of freedom spring-mass system.

24 Claims, 6 Drawing Sheets

(56) References Cited

U.S. PATENT DOCUMENTS

| | | | |
|---|---|---|---|
| 2011/0061460 A1* | 3/2011 | Seeger | G01C 19/5719 |
| | | | 73/504.12 |
| 2013/0167634 A1* | 7/2013 | Lim | G01C 19/56 |
| | | | 73/504.12 |
| 2015/0330785 A1* | 11/2015 | Naono | G01C 25/00 |
| | | | 73/504.12 |
| 2016/0091339 A1* | 3/2016 | Weinberg | G01C 25/00 |
| | | | 73/1.77 |

FOREIGN PATENT DOCUMENTS

| | | |
|---|---|---|
| RU | 2158903 C1 | 11/2000 |
| WO | 2004013573 A2 | 2/2004 |

OTHER PUBLICATIONS

Prikhodko et al., "What is MEMS Gyrocompassing? Comparative Analysis of Maytagging and Carouseling," Journal of Microelectromechanical Systems, vol. 22, No. 6, Dec. 2013, pp. 1257-1266.

Collin, "MEMS IMU Carouseling for Ground Vehicles," IEEE Transactions on Vehicular Technology, vol. 64, No. 6, Jun. 2015, pp. 2242-2251.

Wei et al., "A New MEMS Gyro North Finding Approach Using LSM for Mobile Robot Heading Detection," Proceedings of the SICE Annual Conference 2012, Akita University, Akita, Japan, Aug. 20-23, 2012, Article No. 6318391, pp. 2262-2267.

Cui et al., "Virtual Rate-Table Method for Characterization of Microgyroscopes," IEEE Sensors Journal, vol. 12, No. 6, 2012, pp. 2192-2198.

* cited by examiner

SYSTEM AND METHOD OF ELECTROSTATIC CAROUSELING FOR GYROCOMPASSING

BACKGROUND OF THE INVENTION

Embodiments of the invention relate generally to inertial sensor gyro-compassing and, more particularly, to an electrostatic carouseling technique for inertial sensor gyrocompassing.

Navigation or "north-finding"—where the orientation of a moving object is determined—plays a crucial role in many different industries and technology applications, including aviation, downhole drilling and mining, and the like. Not only is north-finding of importance in these existing areas, but with the recent explosion of use of personal navigation and smart devices that provide navigational capabilities, the role of navigation is expected to expand to many additional industries and technology applications, with consumer drones being an example of one such area.

North-finding is traditionally accomplished through the use of the magnetic field of the earth; however, there are a number of spatial and temporal distortions in this field due to varying magnetic background, which limit the accuracy of magnetic compasses. Moreover, practical limitations of geodetic, celestial, and GPS-based methods make high performance gyroscopes desirable for true north finding. A method of north-finding based on gyroscopes is commonly referred to as "gyrocompassing." Although commercially available macro-scale fiber optic, ring laser, dynamic tuning gyroscope (DTG), and quartz hemispherical resonator gyroscopes can be used for precision gyrocompassing, they are not suitable for man-portable and small platform applications. Additionally, these types of gyroscopes require a rotation stage to find the north direction. Accordingly, it has become increasingly popular to utilize microelectromechanical systems (MEMS)-based inertial sensors for gyrocompassing, as MEMS-based inertial sensors provide a number of inherent benefits, including being light-weight, low-power, batch-fabricated, and potentially capable of high performance operation, given the proper design.

In gyrocompassing, inertial sensors find the geographic direction, e.g., north or east, through the sensing of the Earth's rotation and gravity vector. A horizontal angle between the observer and north direction is defined as the azimuth, $\alpha$, and is measured from north in a clockwise direction, e.g., north is 0° and east is 90°. For such applications as land and aerial navigation, mining, or military, azimuth defines the horizontal direction of heading, pointing or targeting, respectively. Desired azimuth accuracy, $\sigma$, in the range from 1 mrad to 4 mrad is often dictated by the requirements of the specific application in order to achieve a target location error, d, which may be in the range of 1 m to 4 m for each 1 km distance of travel, for example.

One technique that may be utilized to identify or detect the azimuth angle is "carouseling." in carouseling, the gyroscope platform is continuously rotated around the axis that is vertical to the horizontal plane in order to change the horizontal orientation of the gyroscope's sensitive axis with respect to the north, making possible determination of the azimuth angle. The continuous rotation of the platform allows identification of the azimuth angle independently of bias and scale-factor errors. Specifically, the platform rotation causes a variation of angle between the Earth's rotation axis and the gyroscope input axis, leading to a modulation of the gyroscope output by the platform rotation that is independent of gyroscope bias errors. The output is maximum when the gyroscope is pointing north, and minimum when it is pointing south. The sinusoidal fit to the gyroscope output is performed to extract the phase, which is a measure of heading. For each 360° turn, the azimuth angle is calculated by subtracting a phase of the fit from instantaneous position of the platform. At the same time, amplitude demodulation at the frequency of the applied rotation allows to extract time-varying bias and scale-factor independently of the azimuth (phase) measurements.

Another related technique that may be employed to identify or detect the azimuth angle is "maytagging." In maytagging, the gyroscope platform is rotated around the axis that is vertical to the horizontal plane to multiple pre-defined angular positions (e.g., 0°, 45°, 90° 135° . . . 360°, etc.) and caused to dwell on those positions for a certain duration to allow the gyroscope to collect more data points. The same sinusoidal fit and phase extraction algorithm (as used for carouseling) can be used to determine the azimuth for the maytagging operation. Hereafter, carouseling and maytagging are generally referred to together as "carouseling."

While carouseling is robust to bias, scale-factor, and temperature drifts, existing MEMS-based inertial sensors require a rotary platform with slip rings and a drive motor in order to provide for the continuous rotation needed for carouseling. The use of such slip rings and motors in inertial sensors has a number of drawbacks/limitations, including cost, size and reliability of the sensor. That is, physically rotating the platform requires a motor, controls, a cable assembly, etc., all of which significantly increase system cost. Additionally, while MEMS technology allows for the gyroscope to be made very small, the motor and the controls needed for rotation of the platform are much larger than gyroscope itself, therefore limiting the applications of the inertial sensor in environments with space constraints. Still further, it is recognized that the use of rotating components and slip rings can lead to reliability issues for the inertial sensor (as such components are prone to failure and wear) and that inclusion/positioning of the rotating components around the gyroscope axis of sensitivity may result in additional rotation being detected by the gyroscope so as to degrade the system performance.

Therefore, it is desirable to provide an inertial sensor that eliminates the need of physically rotating the gyroscope platform for gyrocompassing.

BRIEF DESCRIPTION OF THE INVENTION

In accordance with one aspect of the invention, a three-rotational degree of freedom spring-mass system includes a proof mass suspended by a plurality of support springs and having three rotational degrees of freedom, a plurality of driving electrodes, and a controller operably connected to the plurality of driving electrodes to apply an excitation voltage thereto to generate an electrostatic force, wherein the controller is configured to selectively apply the excitation voltage to the plurality of driving electrodes to generate an electrostatic force that varies an orientation of a gyroscope sensitivity axis for carouseling of the three-rotational degree of freedom spring-mass system.

In accordance with another aspect of the invention, a method of carouseling a three-rotational degree of freedom spring-mass system for gyrocompassing includes providing a gyroscope having a gyroscope platform oriented in a horizontal plane and a plurality of driving electrodes positioned adjacent a top or bottom surface of the gyroscope platform, and causing a controller to modulate an excitation voltage provided to the plurality of driving electrodes to selectively generate an electrostatic force that changes an orientation of a single sensitivity axis on the horizontal plane, wherein in modulating the excitation voltage the controller causes the orientation of the single sensitivity axis to rotate on the horizontal plane, so as to enable the determination of an azimuth angle.

In accordance with yet another aspect of the invention, a MEMS inertial measurement sensor includes a MEMS gyroscope having a gyroscope proof mass oriented in an x-y plane and a plurality of out-of-plane electrodes positioned adjacent the gyroscope proof mass so as to be arranged about a center axis of the gyroscope proof mass. The MEMS inertial measurement sensor also includes a controller operably connected to the plurality of out-of-plane electrodes to supply an excitation voltage thereto to perform a virtual carouseling of the MEMS gyroscope in the x-y plane. In performing the virtual carouseling of the MEMS gyroscope, the controller is programmed to modulate the excitation voltage supplied to selective electrodes of the plurality of out-of-plane electrodes to rotate a drive axis of the MEMS gyroscope into resonances, with the rotation of the drive axis causing an accompanying rotation of a sensitivity axis of the MEMS gyroscope to provide for determination of an azimuth angle of the MEMS gyroscope.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Embodiments of the invention provide an inertial sensor, in the form of a three-rotational degree of freedom spring-mass gyroscope, that employs electrostatic carouseling for gyro-compassing. A controller of the gyroscope selectively applies an excitation voltage to a plurality of driving electrodes that causes the driving electrodes to generate an electrostatic force that varies the orientation of a gyroscope sensitivity axis for carouseling the sensitivity axis of the gyroscope while the physical gyroscope is not carouseling.

Figure 1:
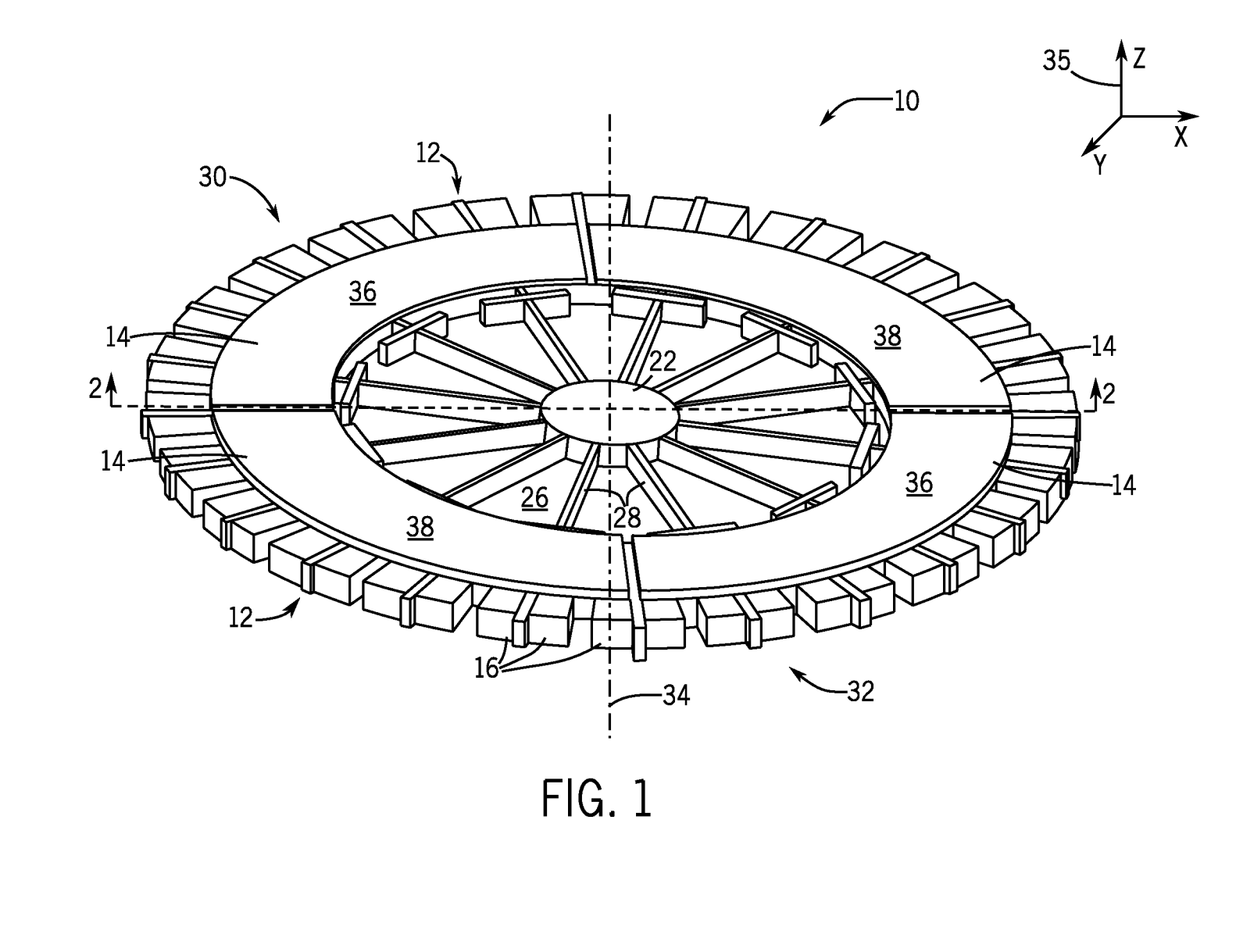
FIG. 1 is a perspective view of a three-dimensional (3D) MEMS disk gyroscope in accordance with an embodiment of the invention.
Figure 2:
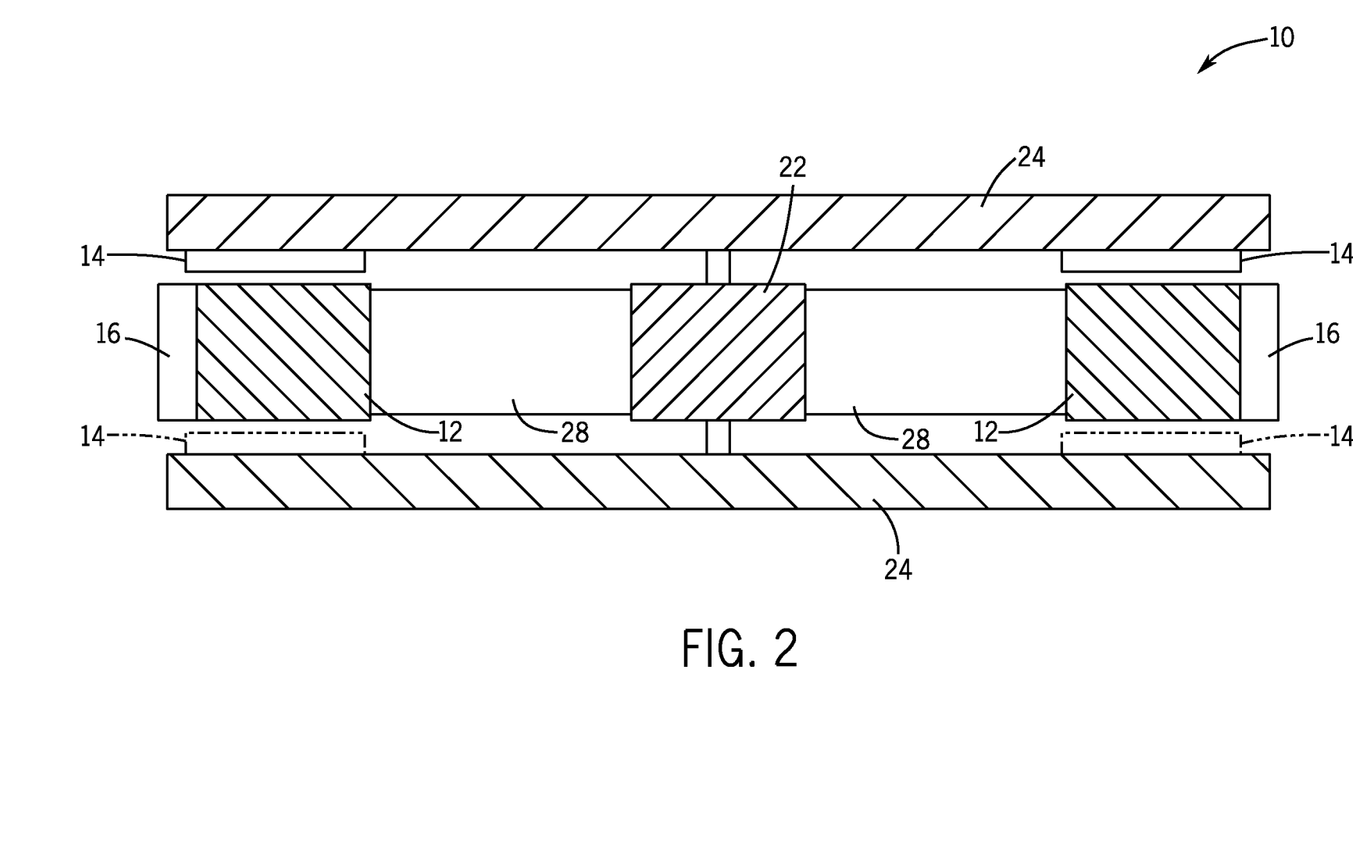
FIG. 2 is a side cross-sectional view of the 3D MEMS disk gyroscope of FIG. 1 taken along line 2-2.
Figure 3:
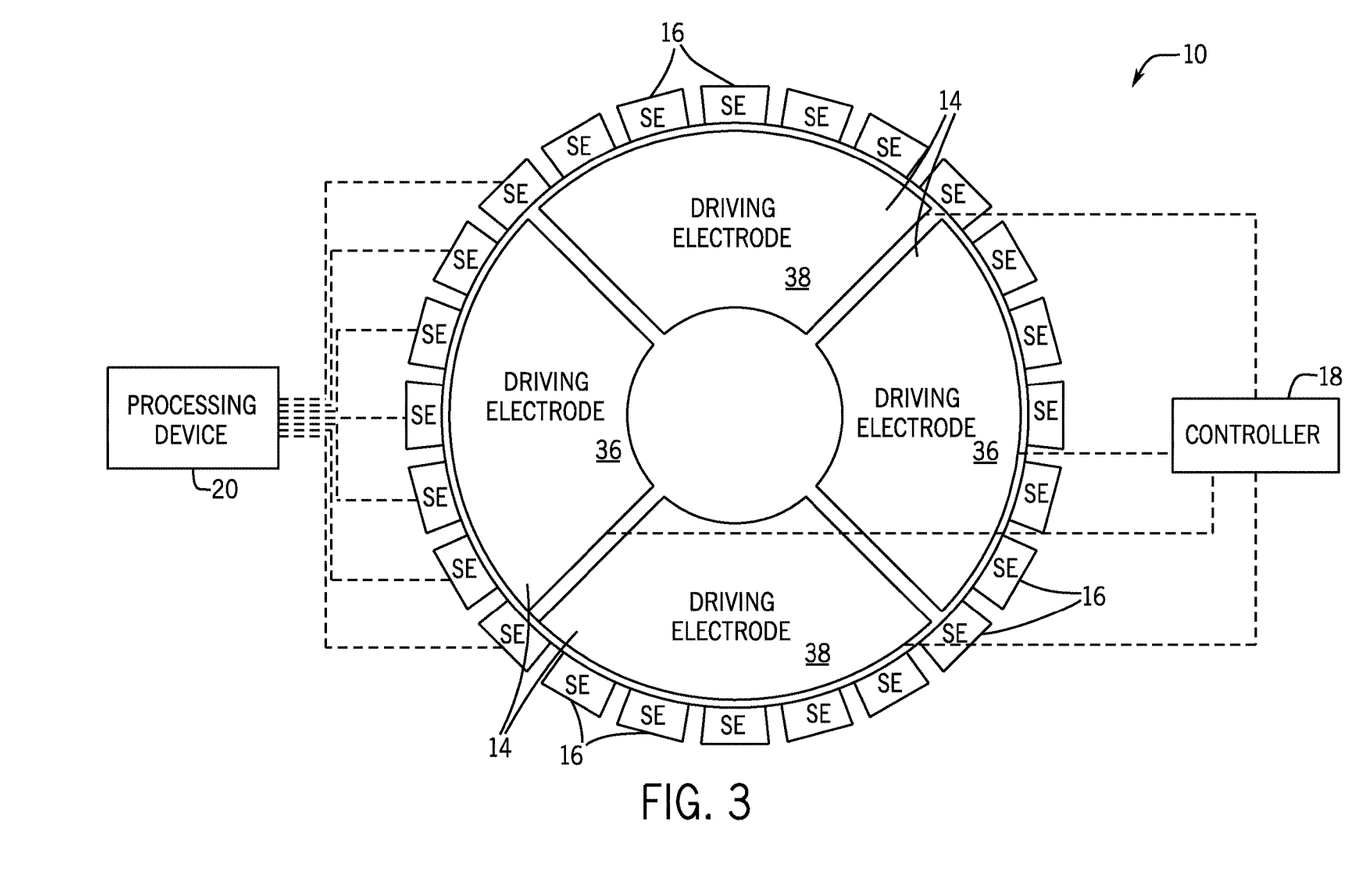
FIG. 3 is a block schematic view of the 3D MEMS disk gyroscope of FIG. 1.

Referring to FIGS. 1-3, perspective, cross-sectional and block schematic views of a three-rotational degree of freedom spring-mass system 10—constructed here as a three-dimensional (3D) microelectromechanical systems (MEMS) disk gyroscope—that functions as an inertial measurement unit (IMU) are illustrated, according to one embodiment. The gyroscope 10 includes a gyroscope proof mass 12 that is oriented in a horizontal plane, a plurality of driving electrodes 14, a plurality of sensing electrodes 16 positioned on and attached to the gyroscope proof mass 12, and a controller 18 operably connected to the driving electrodes 14 that is configured to control operation of the gyroscope 10 to perform gyrocompassing. As used herein, the proof mass 12, or drive mass, is the effective mass whose inertia transforms the input angular velocity into a Coriolis force or torque. A processing device 20 is associated with the gyroscope 10 that is programmed to determine the state of the gyroscope 10 based on outputs provided thereto.

As shown in FIGS. 1 and 2, attached to the gyroscope proof mass 12 of the gyroscope 10 is a central anchor 22, which is attached to a substrate 24 (FIG. 2) on which the gyroscope 10 is mounted. The gyroscope proof mass 12 is formed as a ring-shaped or annular structure such that the central anchor 22 is positioned within an opening 26 defined thereby. A plurality of support springs 28 extend between the central anchor 22 and the gyroscope proof mass 12. The support springs constrain the proof mass 12 relative to the substrate 24 to prevent complete detachment, while at the same providing enough flexbility that the proof mass can still rotate or tilt with repsect to the substrate 24. The driving electrodes 14 are positioned adjacent to the substrate 24 at either a top surface 30 or a bottom surface 32 thereof (adjacent the top surface in FIGS. 1 and 2, and shown in phantom adjacent the bottom surface in FIG. 2), such that they are positioned "out-of-plane" with the gyroscope proof mass 12. In the embodiment of FIGS. 1-3, four driving electrodes 14 are shown as being positioned adjacent the gyroscope proof mass 12 at different angular locations about a center axis 34 thereof, but it is recognized that other embodiments could include a different number of driving electrodes 14, such as eight electrodes. The sensing electrodes 16 are positioned about the gyroscope proof mass 12 (i.e., about a circumference thereof) so as to be "in-plane" therewith.

The controller 18 (FIG. 3) of the gyroscope 10 is programmed to selectively apply an excitation voltage to the driving electrodes 14 in order to operate the gyroscope 10 as a Coriolis vibratory gyroscope (CVG). The MEMS CVG 10 operates by inducing vibratory motion of the proof mass 12 by application of the excitation voltage to driving electrodes 14, i.e., a "drive motion." For the MEMS CVG 10, the drive motion is an oscillatory tilting motion of the gyroscope proof mass 12 with respect to the substrate 24. When the gyroscope 10 is subject to an input angular rate, Coriolis acceleration is induced at the proof mass 12 that is the cross product of the two vectors—drive velocity and input angular rate. The Coriolis acceleration causes the proof mass 12 to undergo mechanical motion in the direction which is perpendicular to both the drive motion and the input angular rate, i.e., a sense motion. The input angular rate can therefore be measured by detecting the sense motion with the necessary signal processing steps including amplification, demodulation, filtering, etc., with one embodiment detecting the Coriolis acceleration by the sensing electrodes 16 through a capacitive change.

With respect to operating the gyroscope 10 as a CVG, it is recognized that because gyroscopic momentum is a cross product of the moment of inertia of the proof mass, angular rotation rate of the proof mass, and the input angular vector, when the direction vector of the drive velocity changes, the direction vector of input angular rate will also need to change in order to produce the same Coriolis acceleration vector. This mechanism is utilized in the CVG 10 by rotating the directional vector of the drive motion within the horizontal plane, forcing the sensitivity axis (direction vector of the input angular rate) to follow and rotate within the horizontal plane. Accordingly, the controller 18 of the gyroscope 10 causes an excitation voltage to be applied to the driving electrodes 14 that causes the driving electrodes 14 to generate an electrostatic force along desired axes of the gyroscope 10—i.e., along a drive axis defined on the x-y plane for the gyroscope—whose orientation can be varied during operation of the gyroscope 10 in order to provide for virtual carouseling of the gyroscope 10, as will be explained in greater detail below.

The processing device 20 (FIG. 3) receives data from the controller 18 and data acquired during operation of the gyroscope 10—such as via data provided thereto from a capacitive detection performed by sensing electrodes 16—and provides the measured angular rate output through the proper signal processing steps including amplification, demodulation, filtering, etc. Based on this data, the processing device 20 can determine the azimuth angle of the gyroscope by using the measured angular rate from the projection of the earth rotation with respect to the "carouseling" phase of the drive motion, with a sinusoidal fit to the gyroscope output being performed to extract the phase and the azimuth angle being calculated by subtracting a phase of the fit from an instantaneous sensitivity axis of the gyroscope 10.

According to an exemplary embodiment of the invention, the gyroscope 10 is utilized for gyrocompassing, i.e., for finding the geographic direction through the sensing of the Earth's rotation and gravity vector—"north-finding." The controller 18 selectively applies an excitation voltage to the driving electrodes 14 so as to generate an electrostatic force along desired axes of the gyroscope 10 in order to provide for virtual carouseling of the gyroscope 10, where the oscillatory axis of the drive motion of the gyroscope proof mass 12 is continuously rotated around vertical (i.e., z-axis 35) in order to change the horizontal orientation of the gyroscope's sensitive axis with respect to the north, making possible determination of the azimuth angle. That is, the rotation of the gyroscope drive motion axis, which is controlled by applying different excitation voltages to the drive electrodes 14, causes a variation of angle between the Earth's rotation axis and the gyroscope input axis, leading to a modulation of gyroscope output by the rotation of the gyroscope input axis—with the gyroscope 10 detecting a maximum earth rotation when the gyroscope sensitivity axis is aligned with north-south direction, and detecting a zero/minimum rotation when the gyroscope sensitivity axis is aligned with the east-west direction. The virtual carouseling of the sensitivity axis along the horizontal plane on the gyroscope proof mass 12 thus changes the output of the gyroscope 10 with respect to the instantaneous orientation of the gyroscope sensitivity axis, with the sinusoidal fit to the gyroscope output being performed to extract the phase, which is a measure of heading. For each 360° turn, the azimuth angle is calculated by subtracting a phase of the fit from the instantaneous orientation of the gyroscope sensitivity axis. At the same time, amplitude demodulation at the frequency of the applied rotation allows to extract time-varying bias and scale-factor independently of the azimuth (Phase) measurements—all of which allow for the orientation of the gyroscope platform to be determined.

Also according to an exemplary embodiment, the gyroscope 10 is utilized for determining Coriolis acceleration. Movement of the proof mass 12 relative to the plurality of sensing electrodes 16 provides for capacitive position sensing, with a capacitance varying based on movement of the proof mass 12 from its neutral position responsive to the Coriolis force—which is a vector cross product of drive velocity and the input angular rate. Based on this capacitive position sensing, angular rate input to the gyroscope 10 can be determined.

Figure 4:
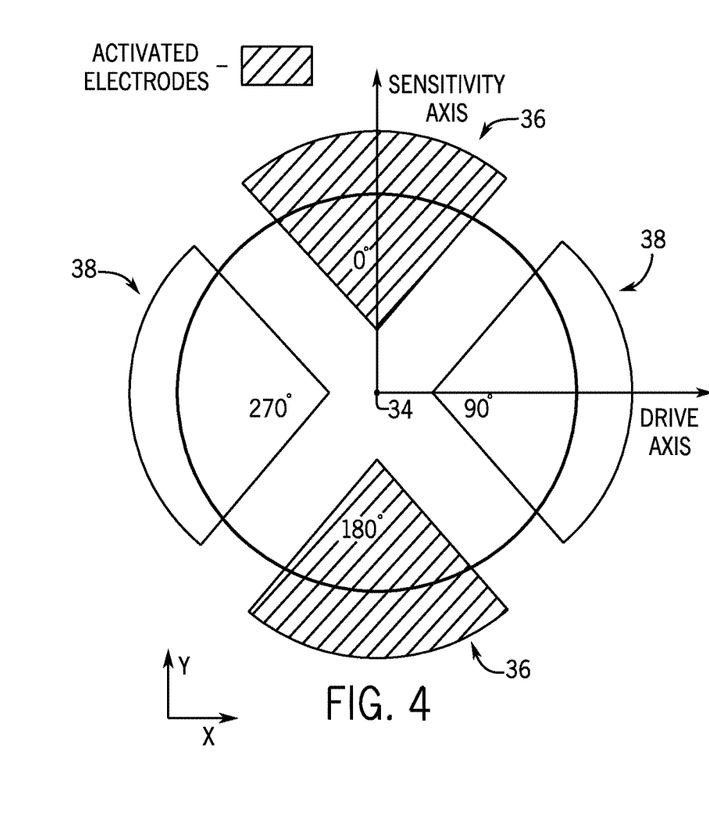
FIG. 4 is a diagrammatic view of the virtual carouseling of the MEMS disk gyroscope of FIGS. 1 and 2, with activation of a pair of driving electrodes to orient the gyroscope sensitivity axis along the y-axis.
Figure 5:
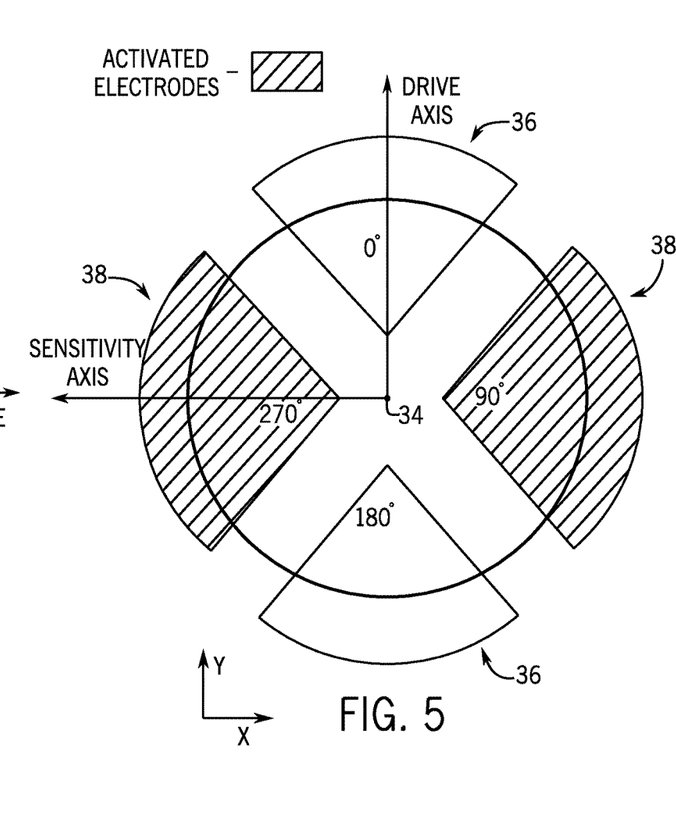
FIG. 5 is a diagrammatic view of the virtual carouseling of the MEMS disk gyroscope of FIGS. 1 and 2, with activation of a pair of driving electrodes to orient the gyroscope sensitivity axis along the x-axis.

Referring now to FIGS. 4 and 5, the carouseling of the gyroscope 10 is illustrated for performing a gyrocompassing function, according to one embodiment. In FIGS. 4 and 5, it is seen that the four driving electrodes 14 of the gyroscope 10 are positioned at different angular locations about the center axis 34—with a first pair 36 of the driving electrodes 14 being positioned at 0° and 180° and a second pair 38 of the driving electrodes 14 being positioned at 90° and 270°. Carouseling of the gyroscope 10 is achieved by controlling the voltages applied to the first and second pairs 36, 38 of driving electrodes 14. More specifically, in one embodiment of the invention, by applying voltage to the first pair 36 of driving electrodes 14 at 0° and 180°, an electrostatic force is generated that causes the gyroscope proof mass 12 to rotate along the X-axis in a vibratory fashion and sense the input angular rate (°/hr) along the Y-axis, as is indicated in FIG. 4. By applying voltage to the second pair 38 of driving electrodes 14 at 90° and 270°, an electrostatic force is generated that causes the gyroscope proof mass 12 to rotate along the Y-axis in a vibratory fashion and sense the input angular rate along the X-axis, as is indicated in FIG. 5.

In another embodiment of the invention, excitation voltages may be applied simultaneously onto the first and second pairs 36, 38 of electrodes 14 but with different amplitudes. When the excitation voltages are applied simultaneously onto the first and second pairs 36, 38 of electrodes 14, the proof mass 12 can rotate along an axis within the x-y plane, the orientation of which is determined by the ratio of voltage amplitude on the first pair 36 and the second pair 38 of drive electrodes 14. The orientation of the axis can thus be described by:

$$\varphi = \tan^{-1}\left(\frac{V_{38}}{V_{36}}\right), \quad [\text{Eqn. 1}]$$

where $\varphi$ is the angle between the rotational axis of the drive motion and the x-axis, $V_{36}$ is the voltage amplitude applied onto the first pair 36 of the drive electrodes 14, and $V_{38}$ is the voltage amplitude applied onto the second pair 38 of drive electrodes 14. Thus, by modulating the voltages applied to the first and second pairs 36, 38 of electrodes 14, the orientation of the gyroscope sensitivity axis can be freely changed as desired within the x-y plane, thus achieving a virtual carouseling of the gyroscope 10.

In operation, application of a voltage to the first and second pairs 36, 38 of driving electrodes 14 is modulated by the controller 18 in a controlled fashion, with the excitation voltages applied to the first and second pairs 36, 38 of electrodes being varied over time, such that the rotational axis of the drive motion changes temporally. In one embodiment, the controller 18 is configured to apply a sinusoidal voltage to the driving electrodes 14 at a frequency of 30 kHz, which is the resonant frequency of the gyroscope 10, although it is recognized that the voltage could be applied at other suitable frequencies. Application of the excitation voltage to the first and second pairs 36, 38 of driving electrodes 14 is called a "drive mode" of operation of the gyroscope 10, with a determination of the input angular rate called a "sense mode" of operation of the gyroscope 10—as achieved via the sensing electrodes 16 and the processor 20 associated with the gyroscope 10. Both drive and sense modes operate at the same time, continuously for gyroscope operation.

Figure 6:
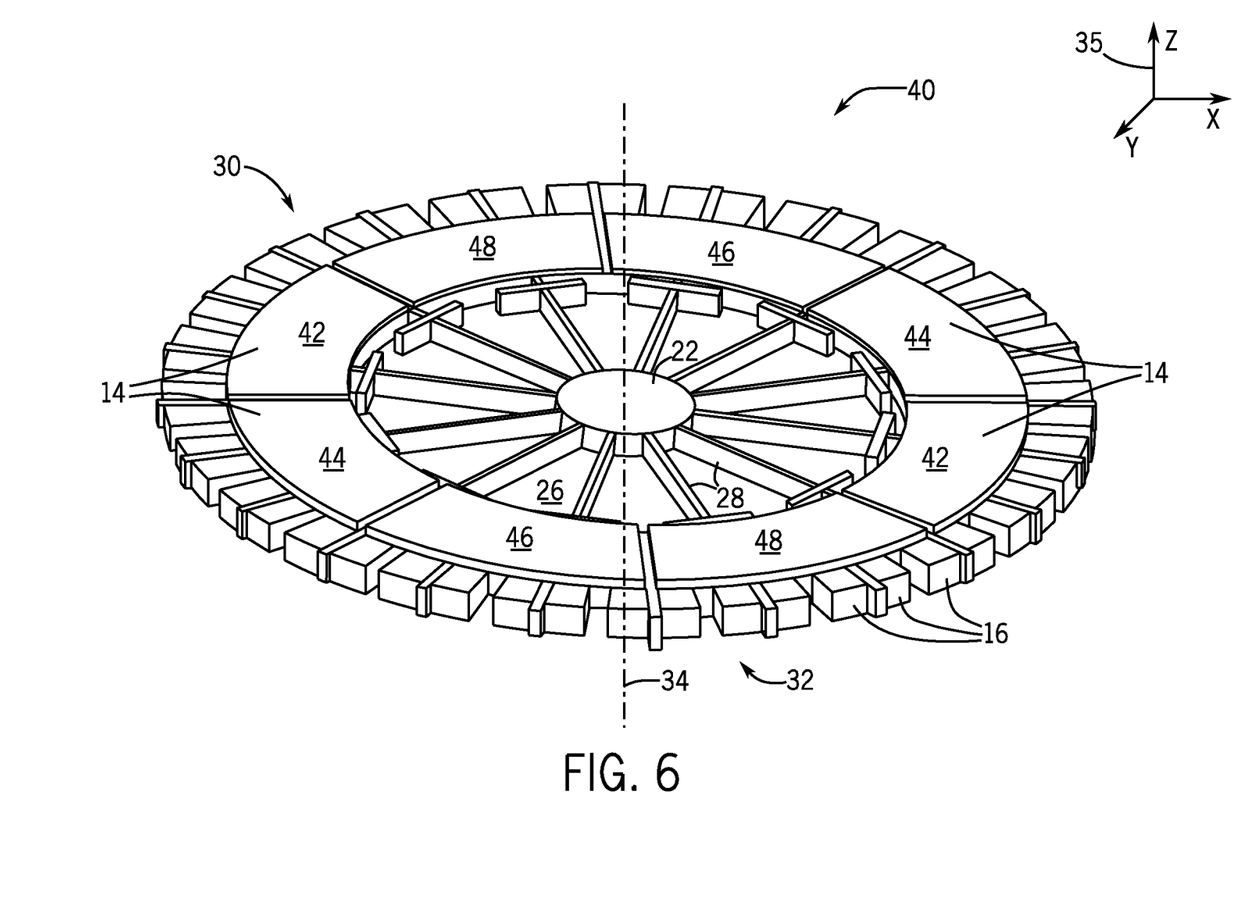
FIG. 6 is a perspective view of a 3D MEMS disk gyroscope in accordance with another embodiment of the invention.

Referring now to FIG. 6, a three-rotational degree of freedom spring-mass system 40—again constructed here as a 3D MEMS disk gyroscope—is illustrated according to another embodiment. As seen in FIG. 6, the gyroscope 40 is constructed to include eight driving electrodes 14 positioned at different angular locations about the center axis. The eight driving electrodes 14 are grouped into a first pair 42, a second pair 44, a third pair 46, and a fourth pair 48 of electrodes—with each pair of electrodes being operatively connected to a controller (e.g., controller 18 of FIG. 2) to receive an excitation voltage therefrom. The first pair 42 of the driving electrodes 14 is positioned at 0° and 180°, the second pair 44 of the driving electrodes 14 is positioned at 45° and 225°, the third pair 46 of the driving electrodes 14 is positioned at 90° and 270°, and the fourth pair 48 of the driving electrodes 14 is positioned at 135° and 315°. By alternating the voltages and/or controlling the amplitude of the voltage amplitude applied to the first, second, third, and fourth pairs 42, 44, 46, 48 of electrodes, the orientation of the gyroscope sensitivity axis can be freely changed as desired (i.e., in 45° increments), with the sensitivity and driving axes by maintained 90° apart, thus achieving a virtual carouseling of the gyroscope 40.

While FIGS. 4 and 6 illustrate gyroscopes 10, 40 constructed so as to include four driving electrodes 14 and eight driving electrodes 14, respectively, it is recognized that embodiments of the invention may be directed to gyroscopes that include other numbers of driving electrodes for purposes of achieving virtual carouseling of the gyroscope. For example, gyroscopes that include six, ten, or sixteen driving electrodes 14 (or still other suitable numbers of driving electrodes) are considered to be within the scope of the invention, and thus the invention is not meant to be limited to the specific embodiments shown and described with respect to FIGS. 4 and 6.

Figure 7:
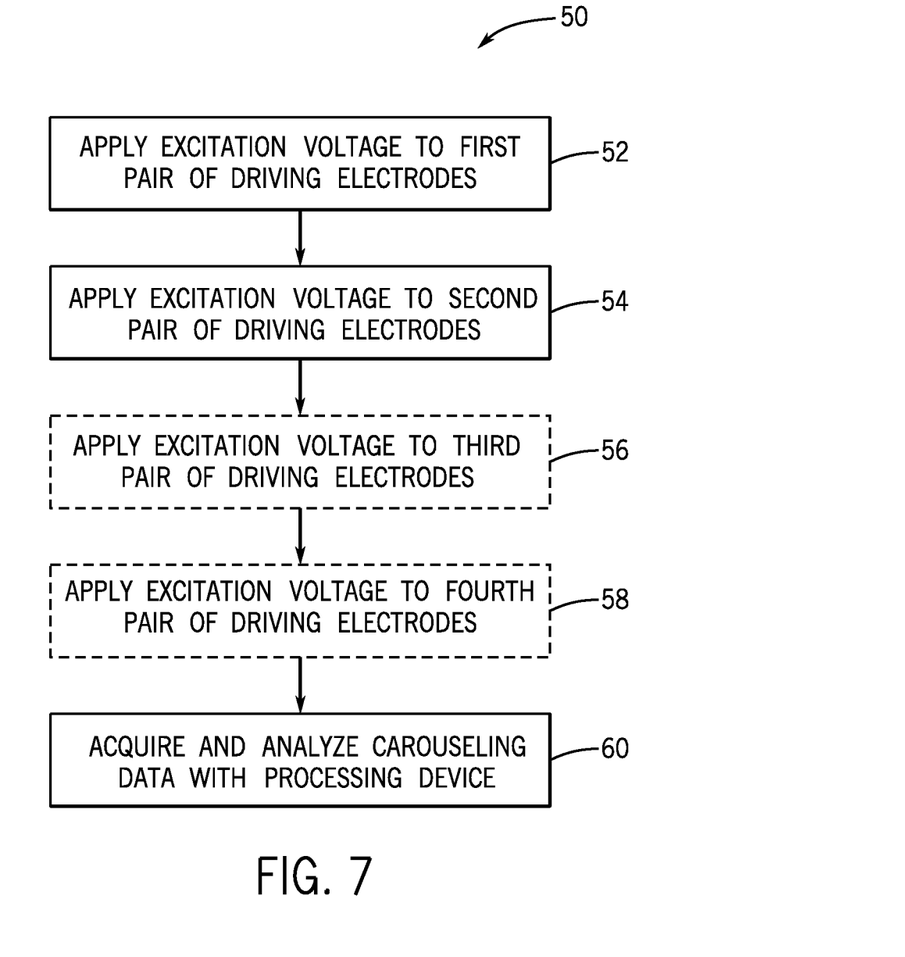
FIG. 7 is a flowchart illustrating a technique for virtual carouseling a 3D MEMS disk gyroscope for gyrocompassing in accordance with an embodiment of the invention.

Referring now to FIG. 7, and with continued reference back to FIGS. 1-6, a technique 50 for carouseling a gyroscope 10, 40 for gyrocompassing is shown, according to an embodiment. The technique 50 may be implemented by a controller—such as controller 18 of FIG. 3—that is programmed to modulate an excitation voltage provided to the driving electrodes 14 of the gyroscope 10, 40 to selectively change an orientation of a single sensitivity axis on the horizontal plane, so as to continuously rotate the sensitivity axis and enable the determination of an azimuth angle.

At STEP 52 of the technique 50, the controller 18 functions to apply an excitation voltage to a first pair of driving electrodes. According to an embodiment where four driving electrodes are provided in gyroscope 10 and an embodiment where eight driving electrodes are provided in gyroscope 40, the first pair of electrodes 36, 42 is at 0 degrees and 180 degrees on the horizontal plane.

At STEP 54 of the technique 50, the controller 18 functions to next apply an excitation voltage to a second pair of driving electrodes, with the excitation voltage being applied temporally subsequent to application of the excitation voltage to the first pair of electrodes 36, 42 at STEP 52.

According to an embodiment where four driving electrodes are provided in gyroscope 10, the second pair of electrodes 38 is at 90 degrees and 270 degrees on the horizontal plane. According to an embodiment where eight driving electrodes are provided in gyroscope 40, the second pair of electrodes 44 is at 45 degrees and 225 degrees on the horizontal plane.

In an embodiment where eight driving electrodes are provided in gyroscope 40, the technique 50 continues at STEP 56, where the controller 18 functions to next apply an excitation voltage to a third pair of driving electrodes 46, with the excitation voltage being applied temporally subsequent to application of the excitation voltage to the second pair of electrodes 44 at STEP 54. According to an embodiment where eight driving electrodes 14 are provided in gyroscope 40, the third pair of electrodes 46 is at 90 degrees and 270 degrees on the horizontal plane.

In an embodiment where eight driving electrodes are provided in gyroscope 40, the technique 50 continues at STEP 58, where the controller 18 functions to next apply an excitation voltage to a fourth pair of driving electrodes 48, with the excitation voltage being applied temporally subsequent to application of the excitation voltage to the third pair of electrodes 46 at STEP 56. According to an embodiment where eight driving electrodes 14 are provided in gyroscope 40, the fourth pair of electrodes 48 is at 135 degrees and 315 degrees on the horizontal plane.

Thus, in an embodiment where four driving electrodes 14 are provided in gyroscope 10, application of the excitation voltage to the first and second pairs of driving electrodes 36, 38 rotates the single sensitivity axis in 90 degree increments on the horizontal plane for carouseling. That is, application of the excitation voltage to the first pair of driving electrodes 36 at STEP 52 orients the gyroscope drive axis along an x-axis of the horizontal plane and orients the single sensitivity axis on a y-axis of the horizontal, and application of the excitation voltage to the second pair of driving electrodes 38 at STEP 54 orients the gyroscope drive axis along the y-axis of the horizontal plane and orients the single sensitivity axis on the x-axis of the horizontal plane. Conversely, in an embodiment where eight driving electrodes are provided in gyroscope 10, application of the excitation voltage to the first, second, third and fourth pairs 42, 44, 46, 48 of driving electrodes rotates the single sensitivity axis in 45 degree increments on the horizontal plane for carouseling.

While technique 50 is described and shown in FIG. 7 as sequentially applying excitation voltages to pairs of driving electrodes—either first and second pairs 36, 38 or first, second, third and fourth pairs 42, 44, 46, 48—at STEPS 52 and 54 (and STEPS 56 and 58), it is recognized that an alternative technique for carouseling a gyroscope 10, 40 for gyrocompassing could be performed via simultaneously applying different voltage amplitudes onto different pairs of driving electrodes, as previously described. That is, for example, excitation voltages may be applied simultaneously onto the first and second pairs 36, 38 of electrodes 14 but with different amplitudes in order to rotate the proof mass 12 along a desired axis within the x-y plane, the orientation of which is determined by the ratio of voltage amplitude on the first pair 36 and the second pair 38 of drive electrodes 14. Thus, by modulating the voltages applied to the first and second pairs 36, 38 of electrodes 14, the orientation of the gyroscope sensitivity axis can be freely changed as desired within the x-y plane, thus achieving a virtual carouseling of the gyroscope 10.

Referring again to FIG. 7, in a next step of technique 50, the processing device 20 functions to acquire and analyze data from the gyroscope 10 at STEP 60 that was acquired via carouseling. That is, the carouseling of the sensitivity axis along the horizontal plane on the gyroscope proof mass 12 changes the output of the gyroscope 10 with respect to an instantaneous axis of sensitivity (i.e., rotation of the sensitivity axis leads to a modulation of gyroscope output by the rotation of gyroscope input axis), which data on the output changes being provided to processing device 20. The processing device 20 may perform a sinusoidal fit to the gyroscope output to extract the phase, which is a measure of heading, such that—for each 360° turn—the processing device 20 calculates the azimuth angle by subtracting a phase of the fit from instantaneous axis of sensitivity.

Beneficially, embodiments of the invention thus provide for virtual carouseling of a gryroscope sensitivity axis without having to physically rotate the gyroscope platform. This virtual carouseling allows eliminates the need for a rotary platform with slip rings, a drive motor and cable assembly in order to provide for the rotation needed for carouseling, such that the cost of the gyroscope can be lowered and the size of the gyroscope reduced. Elimination of the slip rings and the drive motor also improves the reliability of the gyroscope, as components that may be prone to failure are removed from and slip rings can lead to reliability issues for the inertial sensor, as such components are prone to failure and wear.

Therefore, according to one embodiment of the invention, a three-rotational degree of freedom spring-mass system includes a proof mass suspended by a plurality of support springs and having three rotational degrees of freedom, a plurality of driving electrodes, and a controller operably connected to the plurality of driving electrodes to apply an excitation voltage thereto to generate an electrostatic force, wherein the controller is configured to selectively apply the excitation voltage to the plurality of driving electrodes to generate an electrostatic force that varies an orientation of a gyroscope sensitivity axis for carouseling of the three-rotational degree of freedom spring-mass system.

According to another embodiment of the invention, a method of carouseling a three-rotational degree of freedom spring-mass system for gyrocompassing includes providing a gyroscope having a gyroscope platform oriented in a horizontal plane and a plurality of driving electrodes positioned adjacent a top or bottom surface of the gyroscope platform, and causing a controller to modulate an excitation voltage provided to the plurality of driving electrodes to selectively generate an electrostatic force that changes an orientation of a single sensitivity axis on the horizontal plane, wherein in modulating the excitation voltage the controller causes the orientation of the single sensitivity axis to rotate on the horizontal plane, so as to enable the determination of an azimuth angle.

According to yet another embodiment of the invention, a MEMS inertial measurement sensor includes a MEMS gyroscope having a gyroscope proof mass oriented in an x-y plane and a plurality of out-of-plane electrodes positioned adjacent the gyroscope proof mass so as to be arranged about a center axis of the gyroscope proof mass. The MEMS inertial measurement sensor also includes a controller operably connected to the plurality of out-of-plane electrodes to supply an excitation voltage thereto to perform a virtual carouseling of the MEMS gyroscope in the x-y plane. In performing the virtual carouseling of the MEMS gyroscope, the controller is programmed to modulate the excitation voltage supplied to selective electrodes of the plurality of out-of-plane electrodes to rotate a drive axis of the MEMS gyroscope into resonances, with the rotation of the drive axis causing an accompanying rotation of a sensitivity axis of the MEMS gyroscope to provide for determination of an azimuth angle of the MEMS gyroscope.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A three-rotational degree of freedom spring-mass system comprising:
   a proof mass suspended by a plurality of support springs and having three rotational degrees of freedom;
   a plurality of driving electrodes; and
   a controller operably connected to the plurality of driving electrodes to apply an excitation voltage thereto to generate an electrostatic force;
   wherein the controller is configured to selectively apply the excitation voltage to the plurality of driving electrodes to generate an electrostatic force that varies an orientation of a gyroscope sensitivity axis for carouseling of the three-rotational degree of freedom spring-mass system.

2. The three-rotational degree of freedom spring-mass system of claim 1 wherein the plurality of driving electrodes comprises four driving electrodes, the four driving electrodes comprising a first pair of electrodes positioned at 0 degrees and 180 degrees and a second pair of electrodes positioned at 90 degrees and 270 degrees; and
   wherein the controller is configured to:
      apply an excitation voltage to the first pair of electrodes of the plurality of driving electrodes at a first time; and
      apply an excitation voltage to the second pair of electrodes of the plurality of driving electrodes different from the first pair and at a second time subsequent to the first time.

3. The three-rotational degree of freedom spring-mass system of claim 2 wherein:
   application of the excitation voltage to the first pair of the four driving electrodes orients a gyroscope drive axis along an x-axis of a horizontal plane of the proof mass and orients the gyroscope sensitivity axis on a y-axis of the horizontal plane; and
   application of the excitation voltage to the second pair of the four driving electrodes orients the gyroscope drive axis along the y-axis of the horizontal plane and orients the gyroscope sensitivity axis on the x-axis of the horizontal plane.

4. The three-rotational degree of freedom spring-mass system of claim 1 wherein the plurality of driving electrodes comprises four driving electrodes, the four driving electrodes comprising a first pair of electrodes positioned at 0 degrees and 180 degrees and a second pair of electrodes positioned at 90 degrees and 270 degrees; and wherein the controller is configured to apply excitation voltages simultaneously to the first and second pairs of electrodes with different amplitudes, so as to change an orientation of the gyroscope sensitivity axis to a desired orientation in the horizontal plane.

5. The three-rotational degree of freedom spring-mass system of claim 4 wherein the orientation of the gyroscope sensitivity axis is described by:

$$\varphi = \tan^{-1}\left(\frac{V_{38}}{V_{36}}\right),$$

where $\varphi$ is the angle between a rotational axis of a drive motion and the x-axis, $V_{36}$ is a voltage amplitude applied onto the first pair of electrodes, and $V_{38}$ is a voltage amplitude applied onto the second pair of electrodes.

6. The three-rotational degree of freedom spring-mass system of claim 1 wherein the plurality of driving electrodes comprises eight driving electrodes, with the eight driving electrodes comprising a first pair of electrodes, a second pair of electrodes, a third pair of electrodes, and a fourth pair of electrodes; and wherein the controller is configured to:
apply an excitation voltage to the first pair of electrodes at a first time; and
apply an excitation voltage to the second pair of electrodes at a second time subsequent to the first time;
apply an excitation voltage to the third pair of electrodes at a third time subsequent to the second time; and
apply an excitation voltage to the fourth pair of electrodes at a fourth time subsequent to the third time.

7. The three-rotational degree of freedom spring-mass system of claim 6 wherein selective application of the excitation voltage to the first, second, third and fourth pairs of electrodes orients the gyroscope sensitivity axis in 45 degree increments on the horizontal plane, with a gyroscope drive axis being at 90 degrees from the gyroscope.

8. The three-rotational degree of freedom spring-mass system of claim 1 wherein selective application of the excitation voltage to the plurality of driving electrodes by the controller causes a continuous rotation of the gyroscope sensitivity axis around the center axis to enable carouseling.

9. The three-rotational degree of freedom spring-mass system of claim 1 further comprising a central anchor, with the plurality of support springs extending between the central anchor and the proof mass.

10. The three-rotational degree of freedom spring-mass system of claim 1 further comprising a plurality of sensing electrodes positioned about the proof mass and in-plane therewith, the plurality of sensing electrodes providing capacitive position sensing based on a positioning of the proof mass relative to the plurality of electrodes, with a capacitance varying based on movement of the proof mass responsive to an influence of external angular rate thereon.

11. The three-rotational degree of freedom spring-mass system of claim 10 further comprising an orientation sensor configured to:
determine the rotation of the proof mass and the input angular rate from the carouseling;
determine an orientation of the three-dimensional MEMS disk gyroscope based on the rotation of the proof mass and the input angular rate; and
determine Coriolis acceleration of the three-dimensional MEMS disk gyroscope based on the capacitive position sensing provided by the plurality of sensing electrodes.

12. The three-rotational degree of freedom spring-mass system of claim 11 wherein, in determining the orientation of the three-dimensional MEMS disk gyroscope, the orientation sensor is further configured to:
acquire an output of the MEMS disk gyroscope generated from varying the orientation of the gyroscope sensitivity axis on the horizontal plane, the output comprising a varying output resulting from a variation of angle between the Earth's rotation axis and the gyroscope sensitivity axis;
perform a sinusoidal fit to the output of the MEMS disk gyroscope to extract a phase, which is a measure of heading; and
calculate an azimuth angle by subtracting the phase of the fit from an instantaneous orientation of the gyroscope sensitivity axis.

13. The three-rotational degree of freedom spring-mass system of claim 1 wherein the controller is configured to apply the excitation voltage to the plurality of driving electrodes at a resonant frequency of the MEMS disk gyroscope.

14. A method of carouseling a three-rotational degree of freedom spring-mass system for gyrocompassing, the method comprising:
providing a gyroscope comprising:
a gyroscope platform oriented in a horizontal plane; and
a plurality of driving electrodes positioned adjacent a top or bottom surface of the gyroscope platform;
causing a controller to modulate an excitation voltage provided to the plurality of driving electrodes to selectively generate an electrostatic force that changes an orientation of a single sensitivity axis on the horizontal plane;
wherein, in modulating the excitation voltage, the controller causes the orientation of the single sensitivity axis to rotate on the horizontal plane, so as to enable the determination of an azimuth angle.

15. The method of claim 14 further comprising:
acquiring an output of the gyroscope generated from changing the orientation of the single sensitivity axis, the output comprising a varying output resulting from a variation of angle between the Earth's rotation axis and the single sensitivity axis;
performing a sinusoidal fit to the output of the gyroscope to extract a phase, which is a measure of heading; and
determining the azimuth angle by subtracting the phase of the fit from an instantaneous orientation of the single sensitivity axis.

16. The method of claim 14 wherein modulating the excitation voltage comprises:
applying an excitation voltage to a first pair of electrodes of the plurality of driving electrodes at a first time, the first pair of electrodes being at 0 degrees and 180 degrees on the horizontal plane; and applying an excitation voltage to a second pair of electrodes of the plurality of driving electrodes subsequent to application of the excitation voltage to the first pair of electrodes, the second pair of electrodes being at 90 degrees and 270 degrees on the horizontal plane;

wherein applying the excitation voltage to the first pair of electrodes orients a gyroscope drive axis along an x-axis of the horizontal plane and orients the single sensitivity axis on a y-axis of the horizontal plane; and wherein applying the excitation voltage to the second pair of electrodes orients the gyroscope drive axis along the y-axis of the horizontal plane and orients the single sensitivity axis on the x-axis of the horizontal plane.

17. The method of claim 14 wherein modulating the excitation voltage comprises:

applying an excitation voltage to a first pair of electrodes of the plurality of driving electrodes at a first time; and applying an excitation voltage to a second pair of electrodes of the plurality of driving electrodes subsequent to application of the excitation voltage to the first pair of electrodes;

applying an excitation voltage to a third pair of electrodes of the plurality of driving electrodes subsequent to application of the excitation voltage to the second pair of electrodes; and applying an excitation voltage to a fourth pair of electrodes of the plurality of driving electrodes subsequent to application of the excitation voltage to the third pair of electrodes;

the plurality of driving electrodes consisting of eight driving electrodes formed by the first, second, third and fourth pairs of electrodes;

wherein applying the excitation voltage to the first, second, third and fourth pairs of electrodes rotates the single sensitivity axis in 45 degree increments on the horizontal plane.

18. The method of claim 14 wherein modulating the excitation voltage comprises applying excitation voltages simultaneously to a first pair of electrodes and a second pair of electrodes of the plurality of driving electrodes at different amplitudes, so as to change an orientation of the single sensitivity axis to a desired orientation in the horizontal plane.

19. The method of claim 18 wherein the orientation of the single sensitivity axis is described by:

$$\varphi = \tan^{-1}\left(\frac{V_{38}}{V_{36}}\right),$$

where $\varphi$ is the angle between a rotational axis of a drive motion and the x-axis, $V_{36}$ is a voltage amplitude applied onto the first pair of electrodes, and $V_{38}$ is a voltage amplitude applied onto the second pair of electrodes.

20. A microelectromechanical systems (MEMS) inertial measurement sensor comprising:

a MEMS gyroscope comprising:
a proof mass oriented in an x-y plane; and
a plurality of out-of-plane electrodes positioned adjacent the proof mass so as to be arranged about a center axis of the proof mass; and a controller operably connected to the plurality of out-of-plane electrodes to supply an excitation voltage thereto to perform a virtual carouseling of the MEMS gyroscope in the x-y plane;

wherein, in performing the virtual carouseling of the MEMS gyroscope, the controller is programmed to modulate the excitation voltage supplied to selective electrodes of the plurality of out-of-plane electrodes to rotate a drive axis of the MEMS gyroscope into resonances, with the rotation of the drive axis causing an accompanying rotation of a sensitivity axis of the MEMS gyroscope to provide for determination of an azimuth angle of the MEMS gyroscope.

21. The MEMS inertial measurement sensor of claim 20 wherein, upon receipt of an excitation voltage from the controller, the selective electrodes of the plurality of out-of-plane electrodes generate an electrostatic force that rotates the drive axis and sensitivity axis.

22. The MEMS inertial measurement sensor of claim 20 wherein, in modulating the excitation voltage supplied to selective electrodes of the plurality of out-of-plane electrodes, the controller is programmed to:

apply the excitation voltage to a first pair of electrodes of the plurality of out-of-plane electrodes to rotate the drive axis to the x-axis of the x-y plane and rotate the gyroscope sensitivity axis to the y-axis of the x-y plane; and apply the excitation voltage to a second pair of electrodes of the plurality of out-of-plane electrodes to rotate the drive axis to the y-axis of the x-y plane and rotate the sensitivity axis to the x-axis of the x-y plane.

23. The MEMS inertial measurement sensor of claim 20 wherein, in modulating the excitation voltage supplied to selective electrodes of the plurality of out-of-plane electrodes, the controller is programmed to apply excitation voltages simultaneously to a first pair of electrodes and a second pair of electrodes of the plurality of out-of-plane electrodes at different amplitudes, so as to change an orientation of the sensitivity axis to a desired orientation in the x-y plane.

24. The MEMS inertial measurement sensor of claim 20 further comprising:

a central anchor;
a plurality of support springs extending between the central anchor and the proof mass; and
a plurality of sensing electrodes positioned about the gyroscope platform and in-plane therewith, the plurality of sensing electrodes providing capacitive position sensing based on a positioning of the proof mass relative to the plurality of electrodes, with a capacitance varying based on movement of the proof mass responsive to an influence of external angular rate thereon.

* * * * *